United States Patent [19]

Clark

[11] 4,129,665

[45] Dec. 12, 1978

[54] PROCESS FOR THE EXTRACTION OF VEGETABLE MATERIALS

[75] Inventor: Brian Clark, Yverdon, Switzerland

[73] Assignee: Societe d'Assistance Technique pour Produits Nestle S.A., LaTour de Peilz, Switzerland

[21] Appl. No.: 783,564

[22] Filed: Apr. 1, 1977

[30] Foreign Application Priority Data

Apr. 9, 1976 [CH] Switzerland .......................... 4519/76

[51] Int. Cl.² ............................................... A23D 1/08
[52] U.S. Cl. ..................................... 426/432; 426/431
[58] Field of Search ............... 426/425, 431, 432, 433, 426/434, 435

[56] References Cited

U.S. PATENT DOCUMENTS

| | | | |
|---|---|---|---|
| 2,915,399 | 8/1956 | Guggenheim et al. | 426/434 |
| 3,607,280 | 9/1971 | Durchholz | 426/434 |
| 3,720,518 | 3/1973 | Galdo et al. | 426/434 |

*Primary Examiner*—Raymond N. Jones
*Assistant Examiner*—Elizabeth A. Hatcher
*Attorney, Agent, or Firm*—Watson, Leavenworth, Kelton & Taggart

[57] ABSTRACT

A process for extracting vegetable materials in the liquid phase in a group of cells, the "hot cells" containing the most exhausted vegetable material and the "cold cell(s)" the least exhausted vegetable material or fresh material, in which the extract is partially evaporated between the "hot cells" and the "cold cells", wherein extraction liquid is added to the partially evaporated extract in a quantity at least equal to the quantity of evaporated liquid.

6 Claims, 1 Drawing Figure

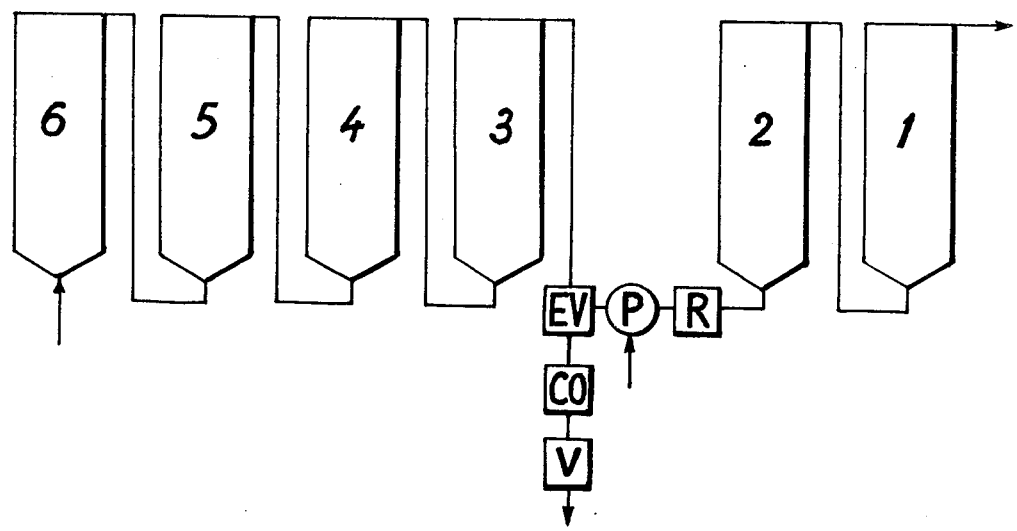

PROCESS FOR THE EXTRACTION OF VEGETABLE MATERIALS

This invention relates to a process for extracting vegetable materials, especially coffee, in the liquid phase.

For extracting coffee, for example, on an industrial scale, hot water is introduced into cells filled with roasted and ground coffee. The cells may be connected by a set of pipes and valves and constitute an extraction group. Extraction is carried out in countercurrent. This means that hot water at 150° to 185° C. is introduced into the cell containing the most exhausted batch of coffee, having been used N-times. The extract issuing from this cell is introduced into the cell containing the batch of coffee which has been used N-1 times and so on until the cell which has just been filled with fresh coffee. The final extract issues from this cell at approximately 100° C. Thus, the spent coffee is subjected to the highest temperature and the fresh coffee to the lowest temperature.

After the extract has passed through the cells, the cell containing the most exhausted coffee is emptied, filled with fresh coffee and, after the cells have been suitably reconnected, extraction may recommence in the same way as before.

For the convenience of the following explanations and following the example set by other publications, the group of cells containing the most exhausted coffee will be called "hot cells" and the other cell or cells "cold cells". This designation corresponds to the "autoclave section" and to the "fresh stage" in previous publications.

The extract of the hot cells, obtained from more or less spent coffee, has a less pleasant taste than that of the cold cells which emanates from a less exhausted coffee. Accordingly, it has been proposed to carry out extraction in a first stage at a relatively low temperature, for example 15° C., after which the partially exhausted product is subjected to an additional extraction in a second stage at a relatively high temperature, in the range from 130° to 180° C. , and to deodorize the hot extract obtained in the second stage by subjecting it to evaporation in vacuo or to rapid expansion.

In order to increase the concentration of the extract whilst, at the same time, maintaining favourable extraction conditions, it has also been proposed to subject the extract to partial evaporation between two cells. In the process according to the invention, however, no attempt is made to increase the concentration.

The process according to the invention is a process for extracting vegetable materials in the liquid phase, in which the extract is partially evaporated between the "hot cells" and the "cold cells", such as defined above. More specifically, but without imposing on the invention a limit which is neither critical nor necessary, the extract obtained at a temperature above 120° C. is partially evaporated.

The process according to the invention is distinguished by the fact that extraction liquid is added to the partially evaporated extract in a quantity at least equal to the quantity of evaporated liquid.

There has been found to be a certain advantage in adding more extraction liquid than has evaporated. However, there is scarcely any advantage in adding more than three times the quantity of evaporated liquid because, by increasing the quantity added, the quantity of liquid to be eliminated during the subsequent conversion of the extract into powder is also increased. In addition, increasing the dilution makes "stripping" more difficult.

The accompanying drawing shows by way of non-limiting example an installation which has been used to try out the invention. This installation primarily comprises 6 cells. The cell containing the most exhausted coffee is denoted by the reference 6 and the cell containing the fresh coffee is denoted by the reference 1. Between the cells 3 and 2, i.e. between the "hot cells" and the "cold cells", there is shown an evaporator EV connected to a condenser CO and to a vacuum pump V, and also a pump P for introducing water into the circuit and a heater R. The heater R is only necessary if, as a result of evaporation, the temperature of the liquid falls below the extraction temperature. A clarification unit may optionally be installed after the heater or between the pump and the heater.

Good results have been obtained with an evaporator-pressure reducer (pressure-reducing valve followed by a "flash" evaporator). The process may also be carried out by heating with an evaporator-heat exchanger.

It is obvious that evaporation and the introduction of water may be effected between cells other than the cells 3 and 2. The tests A to J, of which the results are set out below, were precisely carried out with different arrangements.

Tests were also carried out by introducing the water not immediately after evaporation, but instead after the cell following evaporation or in the cell containing the fresh coffee. The results obtained were good, but the installation is more complicated.

By way of comparison, tests were carried out with a cooler instead of the evaporator without the addition of water (tests W, X), and also with an evaporator, but again without the addition of water (tests Y,Z).

The extracts produced in these tests were then reduced into powder by drying (evaporation, followed by spray-drying or freeze-drying), reconstituted and tasted by a panel of 7 or 8 experienced tasters. The results of these tasting tests confirmed the very considerable improvement in quality obtained by the process according to the invention.

The following Table shows the parameters of a certain number of tests carried out.

| TRIAL | | A | B | C | D | E | F | G | H | I | J | W | X | Y | Z |
|---|---|---|---|---|---|---|---|---|---|---|---|---|---|---|---|
| Temperature | No. 6 | 182 | 182 | 180 | 182 | 182 | 178 | 168 | 178 | 178 | 182 | 175 | 182 | 182 | 178 |
| At Cell INlet | 5 | 174 | 175 | 176 | 176 | 177 | 174 | 164 | 174 | 174 | 177 | 171 | 176 | 174 | 174 |
| | 4 | 168 | 168 | 162 | 165 | 165 | 163 | 157 | 163 | 162 | 165 | 161 | 165 | 168 | 160 |
| ( °C) | 3 | 160 | 160 | 150 | 110 | 110 | 110 | 148 | 152 | 152 | 110 | 157 | 110 | 162 | 150 |
| | 2 | 102 | 102 | 105 | 106 | 106 | 106 | 105 | 105 | 140 | 106 | 140 | 106 | 102 | 105 |
| | 1 | 100 | 100 | 100 | 102 | 102 | 102 | 102 | 102 | 105 | 102 | 102 | 102 | 100 | 100 |
| Evaporation Between Cells Nos (Resp. Cooling For Trials W, X) | | 3-2 | 3-2 | 3-2 | 4-3 | 4-3 | 4-3 | 3-2 | 3-2 | 2-1 | 4-3 | 2-1 | 4-3 | 3-2 | 3-2 |
| Quantity Of Water | | | | | | | | | | | | | | | |

-continued

| TRIAL | A | B | C | D | E | F | G | H | I | J | W | X | Y | Z |
|---|---|---|---|---|---|---|---|---|---|---|---|---|---|---|
| Evaporated in KG/KG Of Roasted + Ground Coffee | 0,75 | 0,75 | 0,75 | 0,75 | 0,75 | 0,6 | 0,6 | 0,4 | 0,4 | 0,25 | 0 | 0 | 0,75 | 0,75 |
| Quantity Of Water Added in KG/KG Of Roasted + Ground Coffee | 0,75 | 0,75 | 1,0 | 1,0 | 2,0 | 1,0 | 1,0 | 1,0 | 1,0 | 1,0 | 0 | 0 | 0 | 0 |
| Solids Content Of The Extract At The Outlet in % | 13,7 | 13,4 | 12,1 | 12,9 | 10,5 | 11,6 | 10,6 | 13,6 | 13,6 | 13,8 | 14,5 | 17,5 | 16,2 | 17,9 |

I claim:

1. A process for extracting vegetable materials to form a vegetable extract by contacting progressively fresher vegetable materials countercurrently with an extraction liquid which comprises:
   (a) passing the extraction liquid through "hot cells" of a group of extraction cells wherein the "hot cells" contain the most exhausted vegetable material;
   (b) partially evaporating the resulting extract;
   (c) adding additional extraction liquid to the partially evaporated extract in a quantity at least equal to the quantity of liquid evaporated; and
   (d) passing the extract through "cold cells" of the group of extraction cells wherein the "cold cells" contain the least exhausted vegetable material to produce the vegetable extract product.

2. A process as claimed in claim 1, wherein more extraction liquid than has evaporated is added.

3. A process as claimed in claim 1, wherein evaporation is carried out by expansion.

4. A process as claimed in claim 1, wherein evaporation is carried out by heating.

5. A process as claimed in claim 1, wherein, after evaporation and the addition of extraction liquid, the extract is heated.

6. A process as claimed in claim 1, wherein, after evaporation, the extract is clarified.

* * * * *

UNITED STATES PATENT AND TRADEMARK OFFICE
CERTIFICATE OF CORRECTION

PATENT NO. : 4,129,665
DATED : December 12, 1978
INVENTOR(S) : Brian Clark

It is certified that error appears in the above-identified patent and that said Letters Patent are hereby corrected as shown below:

The Table beginning on line 58 covering Columns 1 and 2 should read as follows in line 64:

Under column marked "TRIAL" eliminate "1" and "100" and under "2" put the figure --1--.

Under column marked "C" read --100-- instead of "102".

Under column marked "H" read --102-- instead of "105".

Under column marked "I" read --105-- instead of "102".

Under column marked "X" read --102-- instead of "100".

Under column marked "Z" read --100--.

Signed and Sealed this

Nineteenth Day of June 1979

[SEAL]

*Attest:*

RUTH C. MASON
*Attesting Officer*

DONALD W. BANNER
*Commissioner of Patents and Trademarks*